(12) United States Patent
Sakai

(10) Patent No.: US 7,163,296 B2
(45) Date of Patent: Jan. 16, 2007

(54) PROJECTOR

(75) Inventor: Hiroki Sakai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 137 days.

(21) Appl. No.: 10/978,435

(22) Filed: Nov. 2, 2004

(65) Prior Publication Data

US 2005/0168706 A1    Aug. 4, 2005

(30) Foreign Application Priority Data

Dec. 3, 2003  (JP) .............................. 2003-404371
Sep. 17, 2004  (JP) .............................. 2004-271770

(51) Int. Cl.
*G03B 21/00*  (2006.01)
*G03B 21/14*  (2006.01)

(52) U.S. Cl. .......................................... 353/69; 353/70
(58) Field of Classification Search .................. 353/30, 353/69, 70
See application file for complete search history.

(56) References Cited

U.S. PATENT DOCUMENTS

2004/0036813 A1 * 2/2004 Matsuda ...................... 348/744

FOREIGN PATENT DOCUMENTS

| JP | A-03-033893 | 2/1991 |
| JP | A-042679 | 2/1992 |
| JP | A-8-102901 | 4/1996 |
| JP | A-09-270979 | 10/1997 |
| JP | A-2001-069433 | 3/2001 |
| JP | A-2001-186538 | 7/2001 |
| JP | A-2002-365720 | 12/2002 |
| JP | A-2003-018501 | 1/2003 |
| JP | A-2003-195416 | 7/2003 |

\* cited by examiner

*Primary Examiner*—Rodney Fuller
(74) *Attorney, Agent, or Firm*—Oliff & Berridge, PLC

(57) ABSTRACT

A control device of a projector includes: a formation area size changer that inputs size information regarding the size of an optical image formed by an optical modulator and performs size change processing on image information based on the size information to change the size of a formation area of the optical image within a valid area in which the optical image can be formed in the optical modulator; a controller that inputs position information regarding the position of the optical image formed by the optical modulator and performs, based on the position information, position change processing on the image information with the size change processing performed thereon to change the position of the formation area within the valid area; and an optical modulator driver that makes the optical modulator form an optical image based on the image information with the size and the position change processing are performed thereon.

3 Claims, 8 Drawing Sheets

PROJECTOR

BACKGROUND OF THE INVENTION

1. Field of the Invention

The present invention relates to a projector.

2. Description of Related Art

There has been known a projector that modulates a light beam irradiated by a light source in accordance with image information to form an optical image using an optical modulator and projects the optical image on a screen in an enlarged manner using a projection optical device (see Related art document JP2002-365720A).

In this projector, a display size to be projected can be adjusted with use of an electronic zoom function (which is designed to change the display size by utilizing not a lens but a circuit) based on, for example, specified zoom, specified aspect ratio and specified resolution that are set and input by a user.

The electronic zoom function is capable of changing the size of a projection image projected on a screen by performing a predetermined processing on image information and changing the size of an optical image formation area within a valid area available to form the optical image in the optical modulator. With the electronic zoom function, the formation area is generally so enlarged or reduced to be symmetric with respect to a center position of the valid area in the optical modulator while keeping the center position fixed.

The projector disclosed in the above Related art document projects the projection image on the screen with the setting position of the projector being fixed. When the projection image is enlarged or reduced using the electronic zoom function, the formation area is so enlarged or reduced to be symmetric with respect to the center position of the valid area in the optical modulator while keeping the center position fixed. Therefore, the projection image is enlarged or reduced while the center position of the projection image projected on the screen is substantially matched with the center position of the screen.

However, once the setting position of the projector is changed with respect to the screen, the center position of the projection image projected on the screen is misaligned with the center position of the screen. Accordingly, the center position of the projection image cannot be matched with the center position of the screen even by enlarging or reducing the projection image using the electronic zoom function.

To avoid such problem, a method for changing the position of the projection image on the screen by changing the relative position between the optical axis of the projection optical device and the optical axis of the light beam passing through the optical modulator is suggested.

However, this method needs to employ a configuration for moving the projection optical device along an optical image formation plane of the optical modulator in the vertical and horizontal directions, and therefore requiring construction of a structure or mechanism for accurately moving the projection optical device in the vertical and horizontal directions.

SUMMARY OF THE INVENTION

An object of the present invention is to provide a projector capable of changing the size and position of a projection image with ease.

A projector according to an exemplary aspect of the present invention includes: an optical modulator that forms an optical image by modulating a light beam irradiated by a light source; a projection optical device that projects the optical image formed by the optical modulator in an enlarged manner; and a control device that makes the optical modulator form the optical image based on input image information, and the control device includes: a formation area size changer that inputs size information regarding the size of the optical image formed by the optical modulator and performs size change processing on the image information based on the size information to change the size of a formation area of the optical image within a valid area in which the optical image can be formed in the optical modulator; a formation area position changer that inputs position information regarding the position of the optical image formed by the optical modulator and performs, based on the position information, position change processing on the image information with the size change processing performed thereon to change the position of the formation area within the valid area; and an optical modulator driver that makes the optical modulator form the optical image based on the image information on which the size change processing and the position change processing are performed.

The size information mentioned herein includes information regarding aspect ratio and resolution etc. in addition to the size of the optical image, i.e., projection image.

The position information is the information for moving the position of the projection image by a predetermined amount in a predetermined direction, containing a horizontal position change amount and a vertical position change amount.

According to the present invention, since the controller has the formation area size changer, the formation area size changer changes the size of the formation area within the valid area in the optical modulator, and thus the size of the projection image can be easily changed.

According to the present invention, since the controller has the formation area position changer, the formation area position changer changes the position of the formation area within the valid area in the optical modulator, and thus the position of the projection image on a screen can be easily changed. Accordingly, even in the case that the setting position of the projector is changed and therefore the center position of the projection image projected on the screen is misaligned with the center position of the screen, the user sets and inputs the position information for moving the projection image by a predetermined amount in a predetermined direction, and the formation area position changer performs the position change processing to change the position of the projection image, so that the center position of the projection image can be easily adjusted with respect to the center position of the screen. Therefore, without employing a conventional configuration for moving the projection optical device in the vertical and horizontal directions, the position of the projection image on the screen can be easily moved by electric processing, thereby improving the convenience of the projector.

Preferably, in the above-described projector, the control device has a keystone distortion corrector that performs keystone distortion correction processing on the image information to correct a distortion of a projection image generated when the projector performs tilting projection, the keystone distortion corrector performing, based on the position information, the keystone distortion correction processing on the image information on which the size change processing is performed, the formation area position changer performing the position change processing on the image information on which the size change processing and the keystone distortion correction processing are performed.

The tilting projection mentioned herein includes not only vertically-tilting projection by the projector vertically inclined with respect to the screen but also horizontally-tilting projection by the projector horizontally inclined.

According to the present invention, the controller has the keystone distortion corrector. The keystone distortion corrector performs the keystone distortion correction processing based on the position information after the formation area size changer has performed the size change processing. Since the keystone distortion correction processing is performed after the size change processing has been performed by the formation area size changer, the keystone distortion correction processing can be performed according to a change of the distortion caused when the projection image is enlarged or reduced, thereby obtaining the appropriate projection image without distortion even when the projection image is enlarged or reduced. Since the keystone distortion correction processing is performed based on the position information, the keystone distortion correction processing can be performed according to a change of the distortion caused when the position of the projection image is changed, thereby obtaining the appropriate projection image without distortion even when the position of the projection image is changed.

Upon performing the keystone distortion correction processing, image information which is to be performed the processing is generally stored in a storage. In the case that the keystone distortion correction processing is performed on the horizontal keystone distortion of the projection image generated when the tilting projection is performed by the projector horizontally inclined with respect to the screen, the image data is generally large in volume. Therefore, depending on the storage capacity of the storage, the limit value of the correction amount in the keystone distortion correction processing is restricted. That is, if the storage with comparatively small storage capacity is employed, it is difficult to perfectly correct the keystone distortion of the projection image even when the keystone distortion correction processing is performed.

According to the present invention, since the position change processing of the formation area position changer and the keystone distortion correction processing of the keystone distortion corrector are used in combination, the keystone distortion generated in the projection image can be reduced by, for example, changing the position of the projection image on the screen through the position change processing. In the configuration having the storage with a predetermined storage capacity, the limit value of the correction amount in the keystone distortion correction processing can be raised comparing with a conventional configuration for performing only the keystone distortion correction processing. That is, even if the storage with comparatively small storage capacity is employed, it is possible to perfectly correct the keystone distortion of the projection image by using the position change processing and the keystone distortion correction processing in combination.

Preferably, in the above-described projector, the control device has a keystone distortion corrector that performs keystone distortion correction processing on the image information to correct a distortion of a projection image generated when the projector performs tilting projection, the keystone distortion corrector performing the keystone distortion correction processing on the image information on which the size change processing and the position change processing are performed.

Like the above-described case, the tilting projection mentioned herein includes not only the vertically-tilting projection by the projector vertically inclined with respect to the screen but also the horizontally-tilting projection by the projector horizontally inclined.

According to the present invention, the controller has the keystone distortion corrector. The keystone distortion corrector performs the keystone distortion correction processing after the formation area size changer has performed the size change processing and the formation area position changer has performed the position change processing. Accordingly, the keystone distortion correction processing can be performed according to the change of the distortion caused when the projection image is enlarged or reduced, and when the position of the projection image is changed.

Further, since the position change processing of the formation area position changer and the keystone distortion correction processing of the keystone distortion corrector are used in combination, functions and advantages same as those described above can be obtained.

Preferably, in the above-described projector, the formation area size changer and the formation area position changer set a periphery of the formation area in a blanking state upon performing the size change processing and the position change processing on the image information, and the optical modulator driver makes the optical modulator display the periphery of the formation area in black based on the image information on which the size change processing and the position change processing are performed.

According to the present invention, the formation area size changer and the formation area position changer set the periphery of the formation area within the valid area in the blanking state when performing the size change processing and the position change processing on the image information. The optical modulator driver then drives the optical modulator so that the periphery of the formation area in the blanking state is displayed in black. With this configuration, contrast ratio between the formation area of the optical modulator and the periphery of the formation area is increased, and therefore the projection image can be projected sharply on the screen.

DETAILED DESCRIPTION OF PREFERRED EMBODIMENT(S)

[First Exemplary Embodiment]

A first exemplary embodiment of the present invention will be described below with reference to the attached drawings.

[Configuration of Projector]

Figure 1:
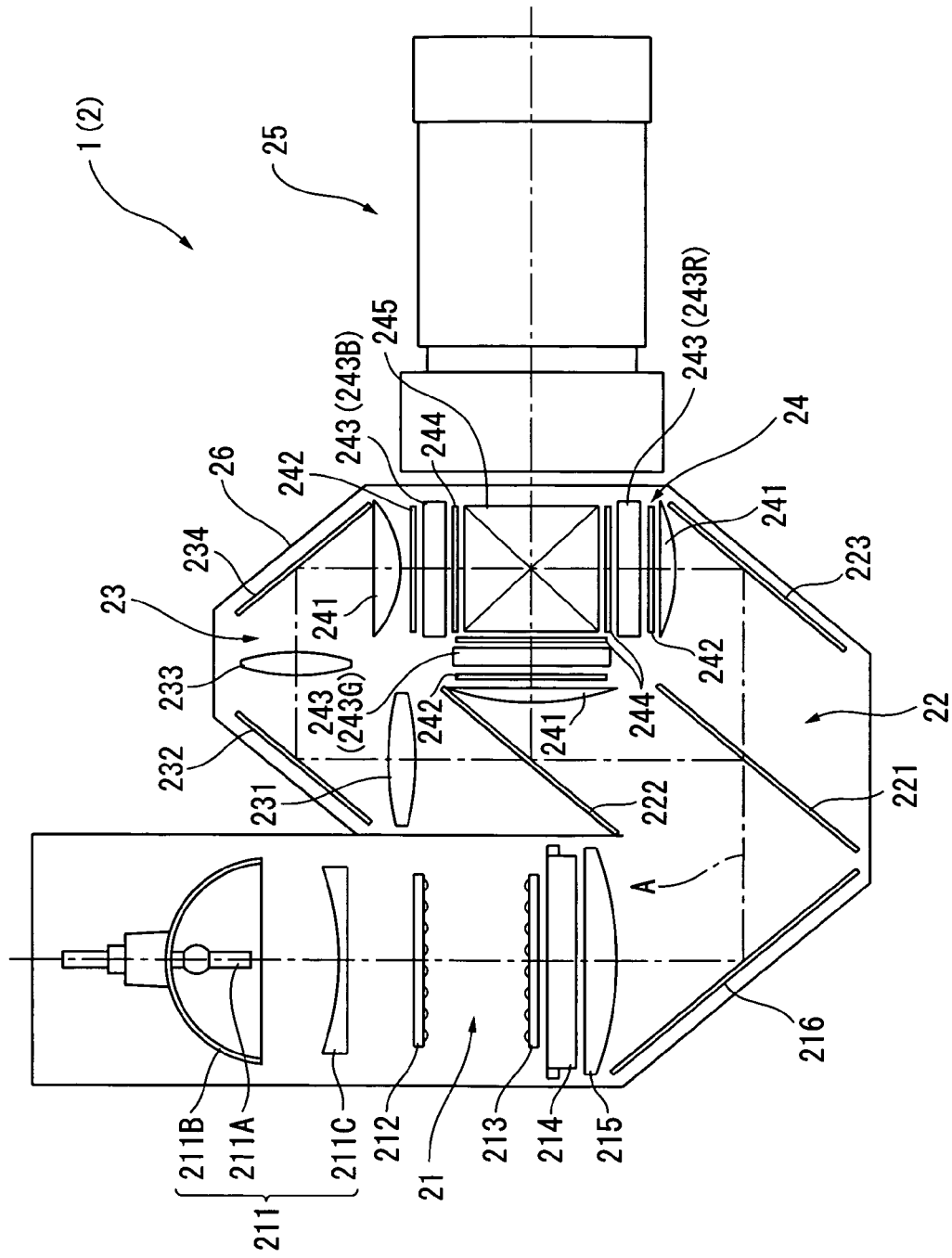
FIG. 1 is a schematic plan view showing structure of a projector according to a first exemplary embodiment.

FIG. 1 is a schematic plan view showing structure of a projector 1.

The projector 1 modulates a light beam irradiated by a light source in accordance with image information to form an optical image, and projects the formed image on a screen in an enlarged manner. As shown in FIG. 1, the projector 1 includes an optical device 2 and a control device (not shown herein).

Under the control of the control device, the optical device 2 forms a predetermined optical image to project the formed optical image on a screen in an enlarged manner. As shown in FIG. 1, the optical device 2 includes an integrator illumination optical system 21, a color-separating optical system 22, a relay optical system 23, an electrooptic device 24, a projection lens 25 as a projection optical device, and an optical component casing 26 in which the optical systems 21 to 25 are stored and arranged.

The integrator illumination optical system 21 splits the light beam irradiated by the light source to uniform in-plane illuminance of an illumination area. The integrator illumination optical system 21 includes a light source device 211, a first lens array 212, a second lens array 213, a polarization converter 214, a superposing lens 215 and a reflection mirror 216.

The light source device 211 irradiates the light beam irradiated from a light source lamp after aligning in a predetermine direction and illuminates the electrooptic device 24. As shown in FIG. 1, the light source device 211 includes a light source lamp 211A, a reflector 211B, and a parallelizing concave lens 211C. The light beam emitted by the light source lamp 211A is irradiated toward the front side of the device as a convergent light by the reflector 211B. The convergent light is then parallelized by the parallelizing concave lens 211C to be irradiated on the first lens array 212. As the light source lamp 211A, halogen lamp, metal halide lamp and high-pressure mercury lamp are often used. In place of the reflector 211B and the parallelizing concave lens 211C, a parabolic mirror may be used.

The first lens array 212 for splitting the light beam irradiated by the light source device 211 into a plurality of sub-beams, includes a plurality of small lenses arranged in a matrix in a plane orthogonal to an illumination optical axis A.

The second lens array 213 is an optical element for condensing a plurality of the sub-beams split by the first lens array 212 and is provided with a plurality of small lenses arranged in a matrix in a plane orthogonal to the illumination optical axis A in the same manner as the first lens array 212. However, since the purpose of the second lens array 213 is to condense the light beams, it is not necessary that the profile of the respective small lenses thereof corresponds to the profile of the image formation area of a later-described optical modulator of the electrooptic device 24.

The polarization converter 214 aligns the polarization direction of the respective sub-beams split by the first lens array 212 into linear polarization in substantially one direction.

Though not illustrated, the polarization converter 214 has a configuration in which polarization separating films and reflection mirrors inclined relative to the illumination optical axis A are alternately arranged. The polarization separating film transmits either one of P polarized light beam or S polarized light beam contained in the respective sub-beams and reflects the other one of the polarized light beams. The reflected polarized light beam is bent by the reflection mirror and is irradiated in the irradiation direction of the transmitted polarized light beam, i.e. along the illumination optical axis A. Either one of the irradiated polarized light beams is polarization-converted by a phase plate provided on the light-irradiation surface of the polarization converter 214 so that the polarization direction of all of the polarized light beams are aligned. With the use of the polarization converter 214, the light beam irradiated by the light source device 211 can be aligned as a polarized light beam in substantially one direction, thereby enhancing the utilization ratio of the light source beam used in the electrooptic device 24.

The superposing lens 215 is an optical element for condensing a plurality of the sub-beams that have passed through the first lens array 212, the second lens array 213 and the polarization converter 214 to superpose the sub-beams on an image formation area of the later-described optical modulator of the electrooptic device 24. The superposing lens 215 is a spherical lens having a flat surface on the incident side of the light-beam transmission area and a spherical surface on the irradiation side in the present exemplary embodiment, but may alternatively be an aspherical lens.

The light beam irradiated by the superposing lens 215 is bent by the reflection mirror 216 to be irradiated to the color-separating optical system 22.

The color-separating optical system 22 includes two dichroic mirrors 221 and 222, and a reflection mirror 223 so that a plurality of the sub-beams irradiated from the integrator illumination optical system 21 are separated by the dichroic mirrors 221 and 222 into three color lights of red (R), green (G) and blue (B).

The dichroic mirrors 221 and 222 are optical elements having a base on which a wavelength-selection film that reflects a light beam of a predetermined wavelength and transmits a light beam of the other wavelength is formed. The dichroic mirror 221 disposed on the upstream of the optical path is a mirror that transmits the red light and reflects the other color lights. The dichroic mirror 222 disposed on the downstream of the optical path is a mirror that reflects the green light and transmits the blue light.

The relay optical system 23 includes an incident-side lens 231, a relay lens 233 and reflection mirrors 232 and 234, and guides the blue light transmitted through the dichroic mirror 222 of the color-separating optical system 22 to the electrooptic device 24. Incidentally, the relay optical system 23 is used for the optical path of the blue light in order to avoid deterioration in the light utilization efficiency on account of light dispersion and the like caused by the longer length of the optical path of the blue light than the optical path of the other color light. Though such arrangement is used in the present exemplary embodiment because of the longer optical path of the blue light, the optical path of the red light may alternatively be lengthened.

The red light separated by the above-described dichroic mirror 221 is bent by the reflection mirror 223 and, subsequently, fed to the electrooptic device 24 through a field lens 241. The green light separated by the dichroic mirror 222 is directly fed to the electrooptic device 24 through the field lens 241. The blue light is condensed and bent by the lenses 231, 233 and the reflection mirrors 232 and 234 of the relay optical system 23 to be fed to the electrooptic device 24 through the field lens 241. Incidentally, the field lenses 241 provided on the upstream of the respective color lights of the electrooptic device 24 convert the respective sub-beams irradiated by the second lens array 213 into a light beam parallel to the illumination optical axis A.

Under the control of the later-described control device, the electrooptic device 24 modulates the incident light beam to form a color image. The electrooptic device 24 includes three incident-side polarization plates 242, three optical modulators 243 (designating the optical modulator at the red light side as 243R, the optical modulator at the green light side as 243G, and the optical modulator at the blue light side as 243B), three irradiation-side polarization plates 244, and a cross dichroic prism 245. The incident-side polarization plates 242, the optical modulators 243 and the irradiation-side polarization plates 244 optically modulate the respective incident color lights.

The respective color lights separated by the color-separating optical system 22 are incident on the incident-side polarization plates 242, which transmit the polarized light in a predetermined direction out of the incident light beam and absorb the other light beams. The incident-side polarization plate 242 has a substrate made of sapphire glass, quarts crystal or the like on which a polarization film is attached. Alternatively, the incident-side polarization plate 242 may be a polarization film attached on the light-irradiation side of the field lens 241.

The irradiation-side polarization plates 244 are arranged generally in the same manner as the incident-side polarization plates 242 to transmit the polarized light in a predetermined direction out of the light beam irradiated by the optical modulator 243 and absorb the other light beams. Alternatively, the irradiation-side polarization plate 244 may be the polarization film attached on the light-incident side of the cross dichroic prism 245.

The incident-side polarization plates 242 and the irradiation-side polarization plates 244 are arranged so that the directions of the polarization axes transmitting the incident light are orthogonal with each other.

The optical modulator 243 is a pair of transparent glass substrates with liquid crystal (electrooptic material) sealed therebetween, which modulates the polarization direction of the polarized light beam irradiated by the incident-side polarization plate 242 in accordance with a drive signal given by the later-described control device using, for instance, polycrystalline silicon TFT (Thin Film Transistor) as a switching element.

The cross dichroic prism 245 is an optical element for combining the optical images irradiated by the irradiation-side polarization plates 244 and modulated for each color light to form a color image. The cross dichroic prism 245 has a square shape in plane view with four right-angle prisms attached with each other, and dielectric multi-layered films are formed on the boundaries adhering the respective right-angle prisms. One of the multi-layered films arranged in generally X-shape reflects the red light, and the other multi-layer film reflects the blue light. These multi-layered films bend the red light and the blue light to align the advancing direction of the green light, thereby combining the three color lights.

The projection lens 25 for projecting the color image formed by the electrooptic device 24 on the not-show screen in an enlarged manner is a lens set of combined plural lenses, and is housed in a cylindrical lens barrel.

[Configuration of Control Device]

Figure 2:
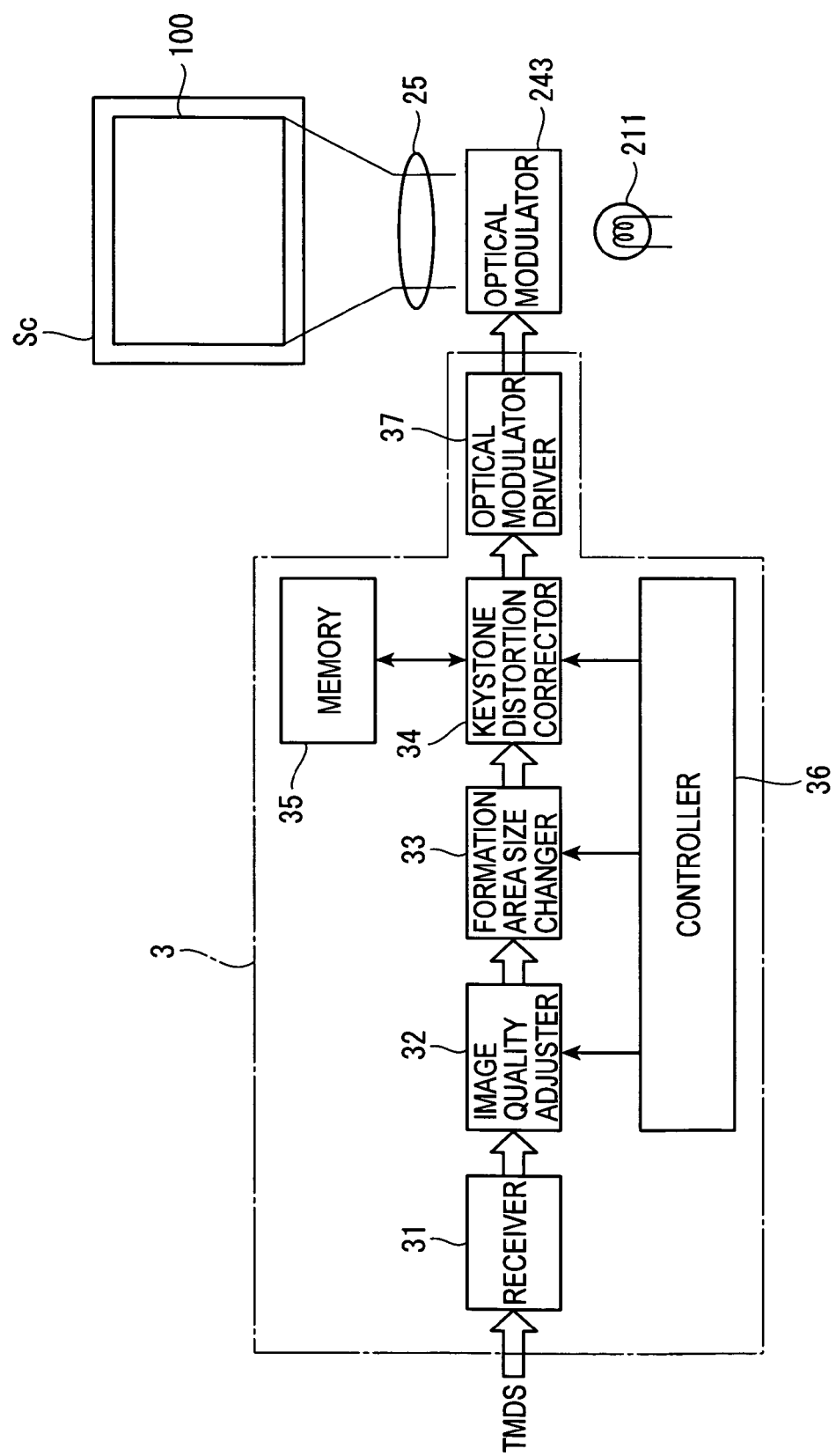
FIG. 2 is a block diagram showing structure that a control device controls an optical modulator according to the aforesaid exemplary embodiment.

FIG. 2 is a block diagram showing structure that a control device 3 controls the optical modulator 243.

The control device 3 includes a processor such as a CPU (Central Processing Unit) to execute a control program stored in a not-shown ROM and the like. The control device 3 controllably drives the optical modulators 243 based on image information input from the outside through a not-shown equipment connector terminal so that the optical modulators 243 form a predetermined optical image. As show in FIG. 2, the control device 3 includes a receiver 31, an image quality adjuster 32, a formation area size changer 33, a keystone distortion corrector 34, a memory 35, a controller 36, and an optical modulator driver 37.

The receiver 31 is a receiver dedicated for inputting digital image signals as image information based on TMDS (Transition Minimized Differential Signaling) system and clock signals. The image information may alternatively be digital image signals based on other transmission system, YUV data representing colors by three sets of information: luminance signal (Y); difference (U) between the luminance signal and red-color components; and difference (V) between the luminance signal and blue-light components, analog image signals or the like. The receiver 31 converts the input digital image signals into gray-scale data in 8-bit RGB (256 gray-scale) to supply the data to the image quality adjuster 32.

Under the control of the later-described controller 36, the image quality adjuster 32 performs image quality adjustment processing on the supplied data based on image quality information such as luminance, contrast, sharpness and color shade output from the controller 36. The image quality adjustment processing can be performed on each of the colors R, G and B. Since the adjustment can be performed on each color, the image quality is flexibly adjustable and thus improving the convenience. The image quality adjuster 32 supplies the data after the image quality adjustment processing to the formation area size changer 33. Detailed description of the image quality adjustment processing in the image quality adjuster 32 will be omitted, since it is well-know art.

Under the control of the later-described controller 36, the formation area size changer 33 performs size change processing on the data supplied from the image quality adjuster 32 based on size information regarding a projection image size such as zoom, aspect ratio and resolution output from the controller 36. The size change processing, performs size change for the data supplied from the image quality adjuster 32 through, for example, scanline conversion processing and performs filtering processing on lines and pixels lost or added upon the size change.

Figure 3A:
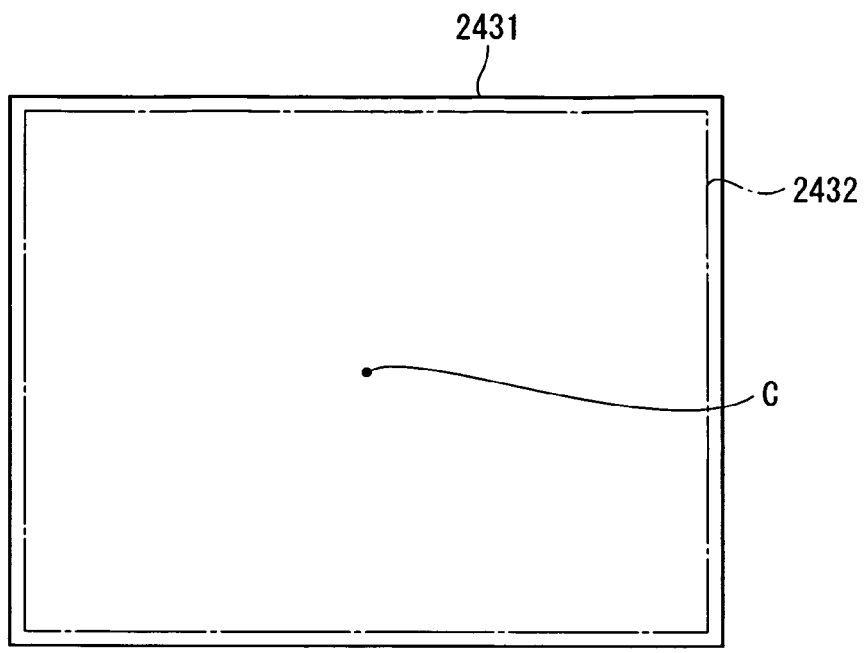
FIGS. 3A and 3B are illustrations each showing an example of size change processing of a formation area size changer according to the aforesaid exemplary embodiment.
Figure 3B:
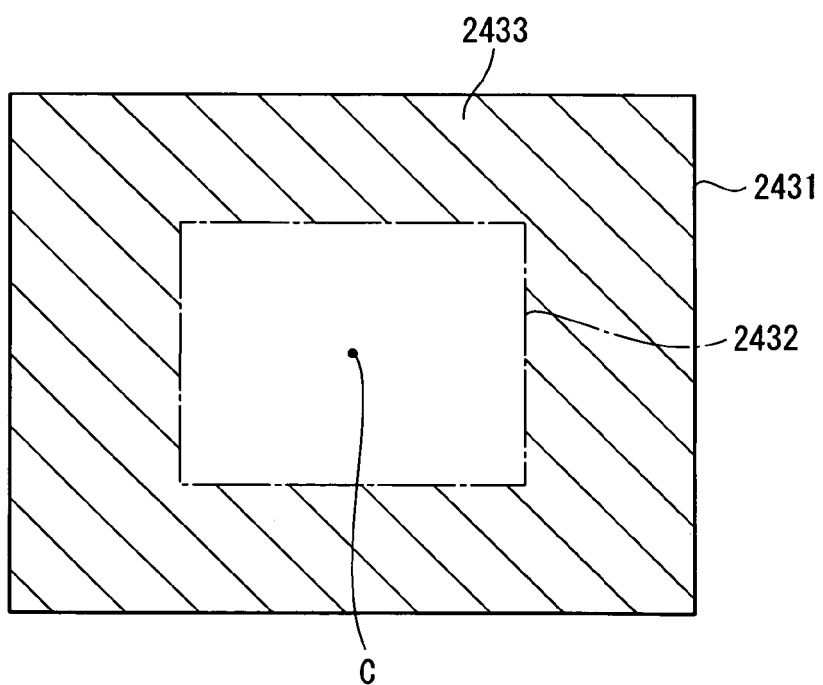

FIGS. 3A and 3B are illustrations each showing an example of the size change processing of the formation area size changer 33.

FIG. 3A is an illustration showing a state in which the size change processing is not performed by the formation area size changer 33. In FIG. 3A, a formation area 2432 in the optical modulator 243 is set to be substantially the same as a valid area 2431, in which an optical image can be formed, in the optical modulator 243.

FIG. 3B is an illustration showing a state in which the size change processing is performed by the formation area size changer 33 based on specified zoom and thus the formation area 2432 is reduced from the state shown in FIG. 3A. As shown in FIG. 3B, the formation area size changer 33 reduces the formation area 2432 to be symmetric from a center position C of the valid area 2431. Also, as shown in FIG. 3B, the formation area size changer 33 sets a periphery 2433 of the formation area 2432 within the valid area 2431 in a blanking state for masking.

Size change processing for enlarging the formation area 2432 based on specified zoom and size change processing for the formation area 2432 based on specified aspect ratio and specified resolution can be preformed substantially in the same manner.

The formation area size changer 33 supplies image data corresponding to the formation area 2432 on which the size change processing is performed to the keystone distortion corrector 34.

Under the control of the later-described controller 36, the keystone distortion corrector 34 performs keystone distortion correction processing of the projection image generated when tilting projection is performed by the projector 1 on the image data supplied from the formation area size changer 33 according to the distortion correction amount output from the controller 36. The keystone distortion correction processing performs, for example, digital processing for changing the number of pixels in the scanline in a predetermined scanline unit, or changing time-line.

FIGS. 4A to 4D are illustrations each showing a specific example of the keystone distortion correction processing of the keystone distortion corrector 34.

Figure 4B:
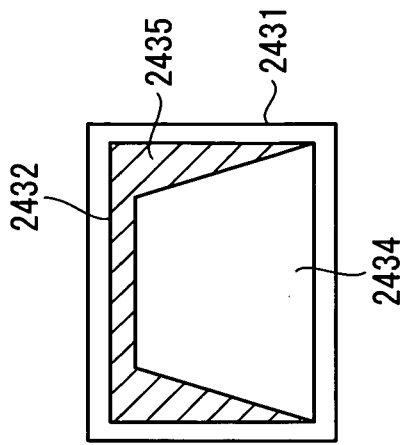
FIGS. 4A to 4D are illustrations each showing a specific example of keystone distortion correction processing of a keystone distortion corrector according to the aforesaid exemplary embodiment.
Figure 4D:
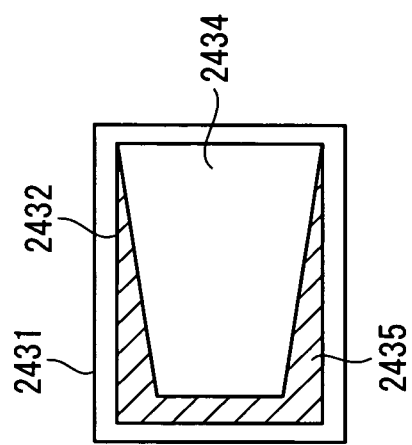
Figure 4A:
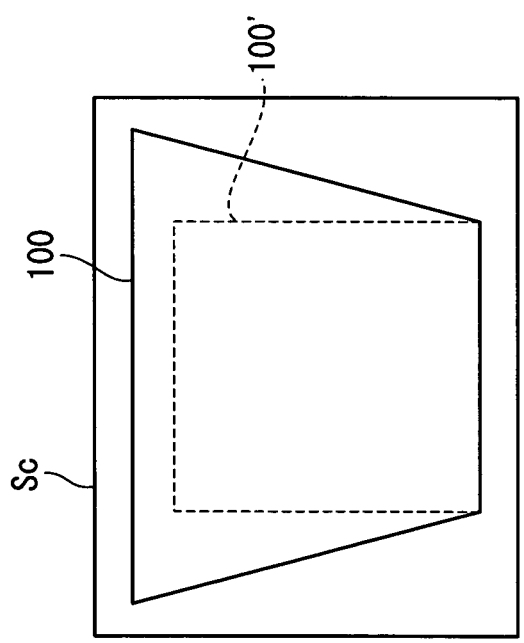

For example, in the case that the projector 1 is inclined to project an image upward for performing vertically-tilting projection, the optical axis of the light beam projected from the projector 1 is inclined with respect to the nominal line direction of a screen Sc plane, and therefore the upper side of a projection image 100 projected on the screen Sc is wide and the lower side thereof is narrow as shown in FIG. 4A. The keystone distortion corrector 34 performs the keystone distortion correction processing on the image data (formation area 2432) supplied from the formation area size changer 33 according to the distortion correction amount output from the later-described controller 36 in order to make the projection image 100 as a projection image 100' without distortion. In this keystone distortion correction processing, as shown in FIG. 4B, vertical distortion correction is performed to deform in advance in a direction opposite to the distortion of the projection image 100 for forming a corrected formation area 2434 by widening the upper side of the formation area 2432 and narrowing the lower side thereof. The keystone distortion corrector 34 sets an area 2435, which is the formation area 2432 excluding the corrected formation area 2434, in a blanking state for masking.

Figure 4C:
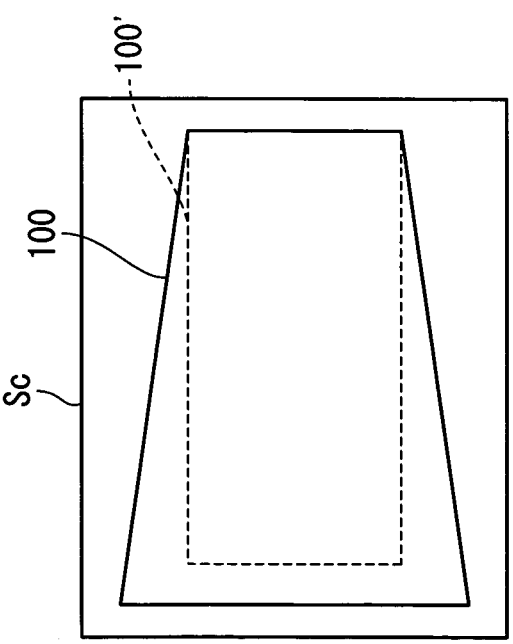

For another example, also in the case that the projector 1 is inclined to project an image sideward for performing horizontally-tilting projection, the optical axis of the light beam projected from the projector 1 is inclined with respect to the nominal line direction of the screen Sc plane, and therefore the left side of the projection image 100 projected on the screen Sc is wide and the right side thereof is narrow as shown in, for instance, FIG. 4C. Like the vertical distortion correction, the keystone distortion corrector 34 performs the keystone distortion correction processing on the image data supplied from the formation area size changer 33 according to the distortion correction amount output from the later-described controller 36 in order to make the projection image 100 as the projection image 100' without distortion. In this keystone distortion correction processing, as shown in FIG. 4D, horizontal distortion correction is performed to deform in advance in a direction opposite to the distortion of the projection image 100 for forming the corrected formation area 2434 by widening the left side of the formation area 2432 and narrowing the right side thereof. The keystone distortion corrector 34 sets the area 2435, which is the formation area 2432 excluding the corrected formation area 2434, in the blanking state for masking.

The keystone distortion corrector 34 then writes corrected image data corresponding to the corrected formation area 2434 on which the keystone distortion correction processing is performed at a corresponding address in the memory 35 based on a write address output from the later-described controller 36.

The memory 35 has data storage area with predetermined addresses being set thereon and stores the corrected image data output from the keystone distortion corrector 34 in the data storage area corresponding to a predetermined address.

More specifically, the memory 35 has a data storage area corresponding to all pixels within the valid area 2431 (FIGS. 3A and 3B), in which an optical image can be formed, in the optical modulator 243. In other words, the position of the pixels serves as the address, and upon storing the corrected image data from the keystone distortion corrector 34, the corrected image data corresponding to the corrected formation area 2434 (FIGS. 4B and 4D) is stored at an approximate center position of the data storage area. Then, pixel positions (addresses) corresponding to the area 2435 (FIGS. 4B and 4D) excluding the corrected formation area 2434 and the periphery 2433 (FIG. 3B) are set in the blanking state.

The controller 36 inputs various parameter values that users set by operating a not-shown remote controller and keys and buttons provided on the body of the projector 1, and makes the image quality adjuster 32, the formation area size changer 33 and the keystone distortion corrector 34 perform the image quality adjustment processing, the size adjustment processing and the keystone distortion correction processing.

The various parameter values mentioned herein may be position information for moving the projection image 100 displayed on the screen Sc by a predetermined amount in a predetermined direction as well as the above-described image quality information and size information.

The position information contains, for example, a horizontal position change amount (H) and a vertical position change amount (V).

For example, based on the input position information, the controller 36 generates a distortion correction amount to be used for the keystone distortion correction processing of the keystone distortion corrector 34 as follows.

The controller 36 inputs inclination angle information regarding inclination of the projector 1 detected by a not-shown angle sensor, such as gyro-sensor installed in the projector 1.

Then, based on the input position information and inclination angle information, the controller 36 calculates inclination angle (tilting angle in the horizontal and vertical directions) of the optical axis of the light beam projected from the projector 1 with respect to the screen Sc plane and generates the distortion correction amount based on the inclination angle. This distortion correction amount is generated by referring to, for instance, a data table in which predetermined distortion correction amounts are set for predetermined inclination angles.

In other words, by performing the keystone distortion correction processing according to a distortion correction amount based on the previously-mentioned position information, the keystone distortion corrector 34 performs the keystone distortion correction processing in a condition where the formation area 2432 (FIGS. 3A and 3B) is substantially moved by a predetermined amount in a predetermined direction.

The controller 36 also makes the keystone distortion corrector 34 execute operation for writing data at a predetermined address in the memory 35 in synchronization with the clock signals input through the receiver 31 and operation (position change processing) for reading data from a predetermined address. Namely, the formation area position changer according to the present invention corresponds to the controller 36.

Figure 5:
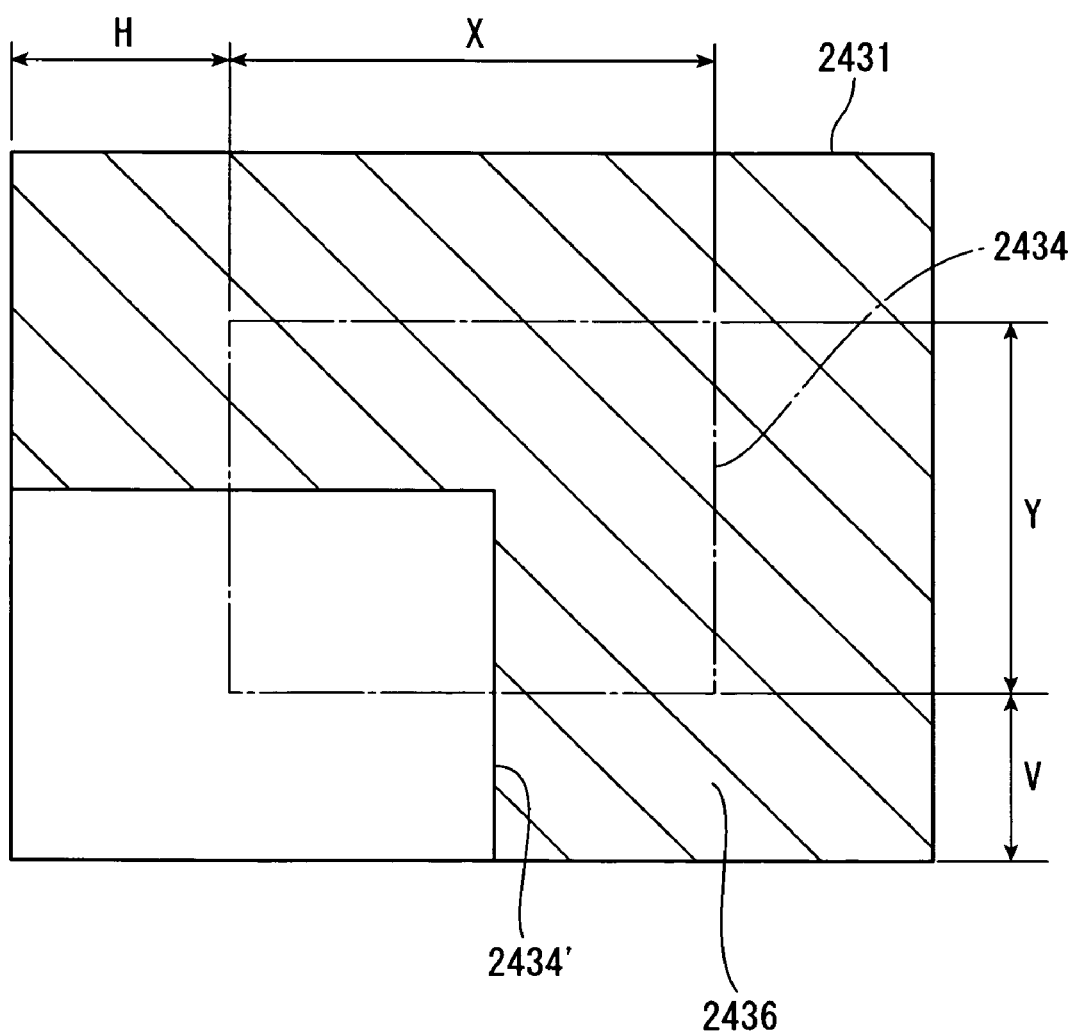
FIG. 5 is an illustration showing operation (position change processing) of a controller for reading data from a memory according to the aforesaid exemplary embodiment.

FIG. 5 is an illustration showing operation (position change processing) of the controller 36 for reading data from the memory 35. In FIG. 5, the corrected formation area 2434 is shown to be rectangular for simplifying the description thereof.

The controller 36 makes the keystone distortion corrector 34 read the corrected image data corresponding to the corrected formation area 2434 from a position shifted by the horizontal position change amount (H) in the input position information as a readout-start position in the horizontal direction. The keystone distortion corrector 34 stops readout in the horizontal direction at a position moved by horizontal size value (X) of the corrected formation area 2434 based on the size information as a readout-end position.

Likewise, the controller 36 makes the keystone distortion corrector 34 read the corrected image data from a position shifted by the vertical position change amount (V) in the input position information as a readout-start position in the vertical direction. The keystone distortion corrector 34 stops readout in the vertical direction at a position moved by vertical size value (Y) of the corrected formation area 2434 based on the size information as a readout-end position.

With above-described readout operation (position change processing), the corrected formation area 2434 corresponding to an approximate center position of the valid area 2431 is moved by the horizontal position change amount (H) and the vertical position change amount (V), so that the corrected image data corresponding to a moved corrected formation area 2434' is read as shown in FIG. 5.

This read corrected image data is supplied to the optical modulator driver 37. In this step, the position of an area 2436 (including the area 2435 shown in FIGS. 4B and 4D) excluding the corrected formation area 2434' is set in the blanking state, and black image data representing black is supplied so that nothing is displayed in the area. The optical modulator driver 37 outputs drive signals corresponding to the corrected image data and the black image data to the optical modulator 243.

The optical modulator 243 modulates the light beam irradiated by the light source device 211 in response to the drive signals and forms an optical image on which the image quality adjustment processing, the size change processing, the keystone distortion correction processing and the position change processing are performed.

In the above-described first exemplary embodiment, since the formation area size changer 33 of the control device 3 performs the size change processing based on the size information set by user's input operation to change the size of the formation area 2432 within the valid area 2431 in the optical modulator 243, the size of the projection image 100 can be easily changed.

Also, since the controller 36 of the control device 3 performs the readout operation (position change processing) based on the horizontal position change amount (H) and the vertical position change amount (V) set by user's input operation to change the position of the corrected formation area 2434 within the valid area 2431 in the optical modulator 243, the position of the projection image 100 on the screen Sc can be easily changed. Accordingly, in the case that the setting position of the projector 1 is changed and therefore the center position of the projection image 100 projected on the screen Sc is misaligned with the center position of the screen Sc, the user sets and inputs the horizontal position change amount (H) and the vertical position change amount (V), and the controller 36 performs the readout operation (position change operation) to change the position of the projection image 100, so that the center position of the projection image 100 can be easily adjusted with respect to the center position of the screen Sc. Therefore, without employing a conventional configuration for moving the projection lens 25 in the vertical and horizontal directions, the position of the projection image 100 on the screen Sc can be easily moved by electric processing, thereby improving the convenience of the projector 1.

Since the keystone distortion corrector 34 of the control device 3 performs the keystone distortion correction processing after the formation area size changer 33 has performed the size change processing, the keystone distortion correction processing can be performed according to a change of the distortion caused when the projection image 100 is enlarged or reduced, thereby obtaining the appropriate projection image 100 without distortion even when the projection image 100 is enlarged or reduced. Since the keystone distortion corrector 34 performs the keystone distortion correction processing according to the distortion correction amount based on the position information, the keystone distortion correction processing is performed in a condition where the formation area 2432 is substantially moved by a predetermined amount in a predetermined direction. The keystone distortion correction processing can be therefore performed according to a change of the distortion caused when the position of the projection image 100 is changed, thereby obtaining the appropriate projection image 100 without distortion even when the position of the projection image 100 is changed.

Incidentally, in the case that the keystone distortion correction processing is performed on the horizontal keystone distortion of the projection image 100 generated when the horizontally-tilting projection is performed by the projector 1 horizontally inclined with respect to the screen Sc, the corrected image data is generally large in volume. Therefore, depending on the storage capacity of the memory 35, the limit value of the correction amount in the keystone distortion correction processing is restricted. That is, if the memory 35 with comparatively small storage capacity is employed, it is difficult to perfectly correct the keystone distortion of the projection image 100 even when the keystone distortion correction processing is performed.

In this exemplary embodiment, since the readout operation (position change processing) of the controller 36 and the keystone distortion correction processing of the keystone distortion corrector 34 are used in combination, the keystone distortion generated in the projection image 100 can be reduced by changing the position of the projection image 100 on the screen Sc through the readout operation (position change processing) of the controller 36.

Figure 6:
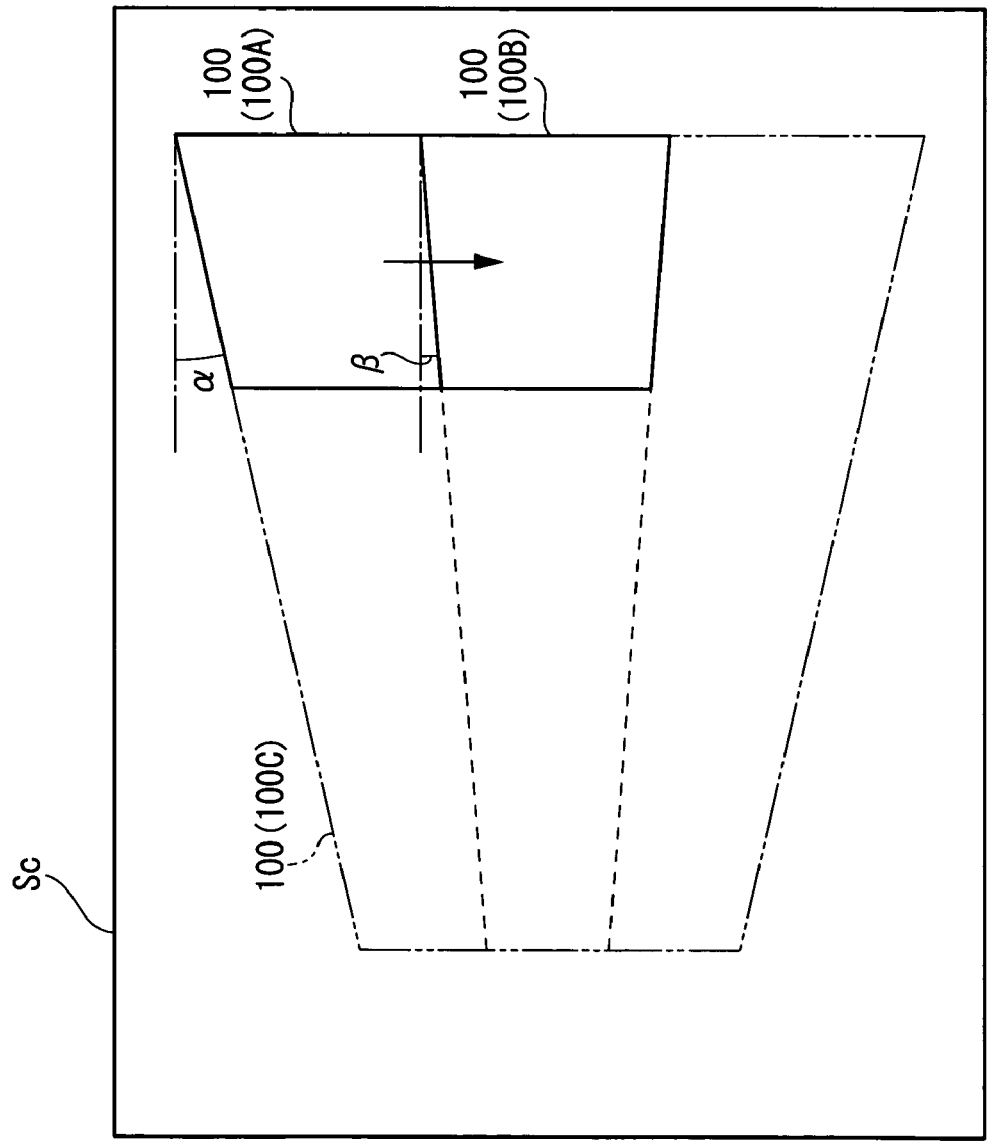
FIG. 6 is an illustration showing an example of a projection image with keystone distortion reduced by the position change processing according to the aforesaid exemplary embodiment.

FIG. 6 is an illustration showing an example of the projection image 100 with the keystone distortion reduced by the position change processing. In FIG. 6, an outer trapezoidal projection image 100C is a projection image of the whole valid area in the optical modulator 243. Projection images 100A and 100B are projection images of formation areas reduced by the formation area size changer 33 with respect to the whole valid area in the optical modulator 243.

As shown in FIG. 6, the projection image 100A has horizontal keystone distortion generated when the horizontally-tilting projection is performed. Referring to the correction amount in the keystone distortion correction processing, the correction amount becomes greater if an angle α becomes greater, and the correction amount becomes smaller if the angle α becomes smaller. As shown in FIG. 6, by moving the projection image 100A downward (in FIG. 6) to be the projection image 100B through the readout operation (position change processing) of the controller 36, an angle β corresponding to the correction amount can be reduced.

Accordingly, in the configuration having the memory 35 with predetermined storage capacity, the limit value of the correction amount in the keystone distortion correction processing can be raised comparing with a conventional configuration for performing only the keystone distortion correction processing. That is, even if the memory 35 with comparatively small storage capacity is employed, it is possible to correct the keystone distortion of the projection image 100 to a larger extent by using the position change processing and the keystone distortion correction processing in combination.

When the formation area size changer 33, the keystone distortion corrector 34 and the controller 36 perform the size change processing, the keystone distortion correction processing and the readout operation (position change processing), the area 2436, which is the area excluding the corrected formation area 2434' within the valid area 2431, is set in the blanking state, and the optical modulator driver 37 drives the optical modulator 243 so that the area 2436 in the blanking state is displayed in black. By thus avoiding the light beam transmission from unnecessary section having no image to be displayed, contrast ratio between the corrected formation area 2434' of the optical modulator 243 and the area 2436 is increased, and therefore the projection image 100 can be projected sharply on the screen Sc.

[Second Exemplary Embodiment]

Next, a second exemplary embodiment of the present invention will be described with reference to the attached drawings.

In the following description, the components same as those in the first exemplary embodiment are indicated by the same reference symbols or numerals for omitting or simplifying the detailed description thereof.

In the first exemplary embodiment, the controller 36 performs the size change processing by reading data from a predetermined address in the memory 35. The position change processing is performed after the keystone distortion correction processing of the keystone distortion corrector 34.

On the other hand, in the second exemplary embodiment, the position change processing is performed before the keystone distortion correction processing of the keystone distortion corrector 34.

Figure 7:
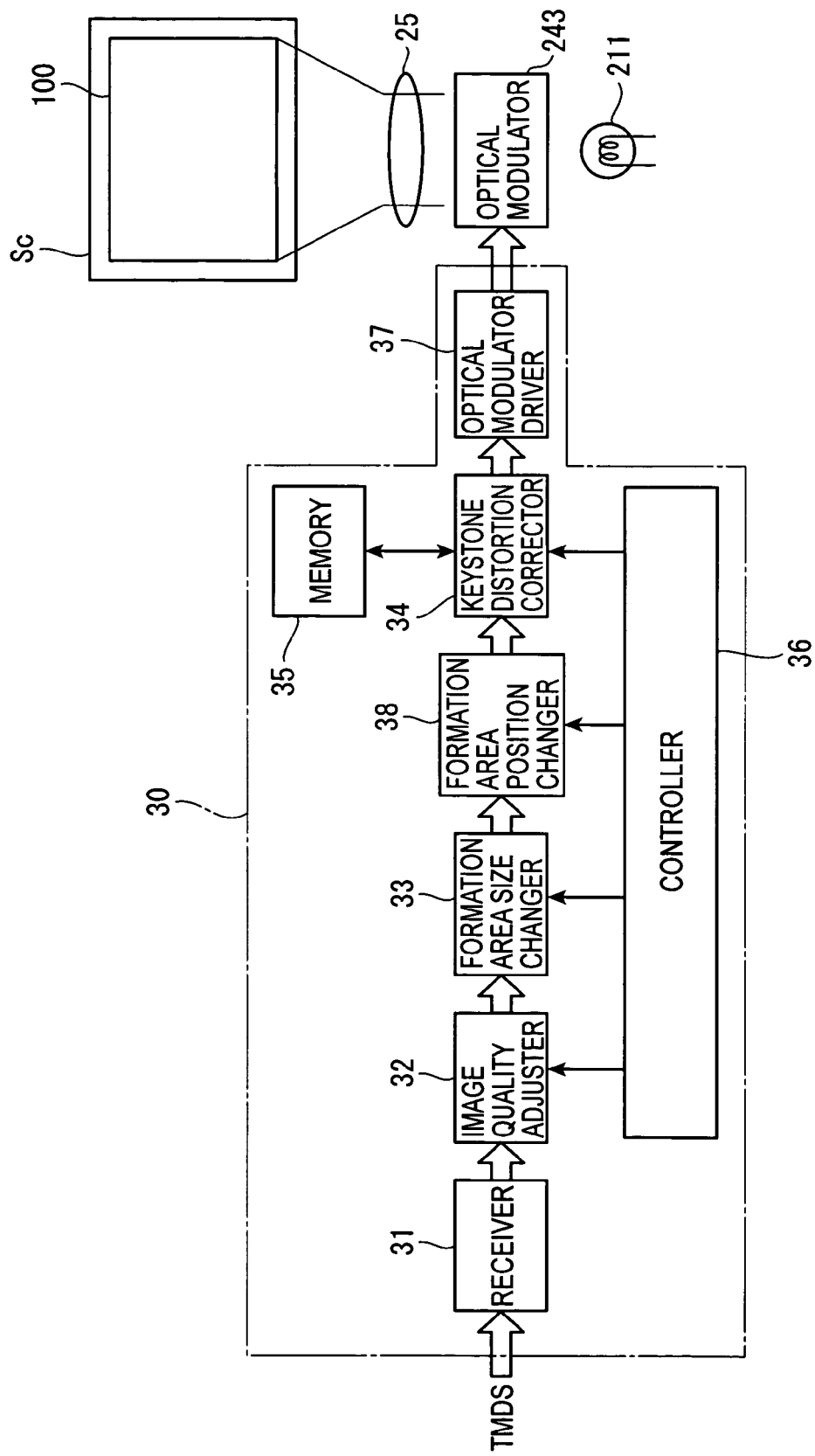
FIG. 7 is a block diagram showing structure that a control device controls an optical modulator according to a second exemplary embodiment.

For example, FIG. 7 is a block diagram showing structure that a control device 30 controls the optical modulator 243.

The control device 30 includes a formation area position changer 38 in addition to the receiver 31, the image quality adjuster 32, the formation area size changer 33, the keystone distortion corrector 34, the memory 35, and the controller 36.

Under the control of the controller 36, the formation area position changer 38 performs position change processing on image data supplied from the formation area size changer 33 based on position information for moving the projection image 100 displayed on the screen Sc output from the controller 36 by a predetermined amount in a predetermined direction. As described in the first exemplary embodiment, the position information contains, for example, horizontal position change amount (H) and vertical position change amount (V).

Figure 8:
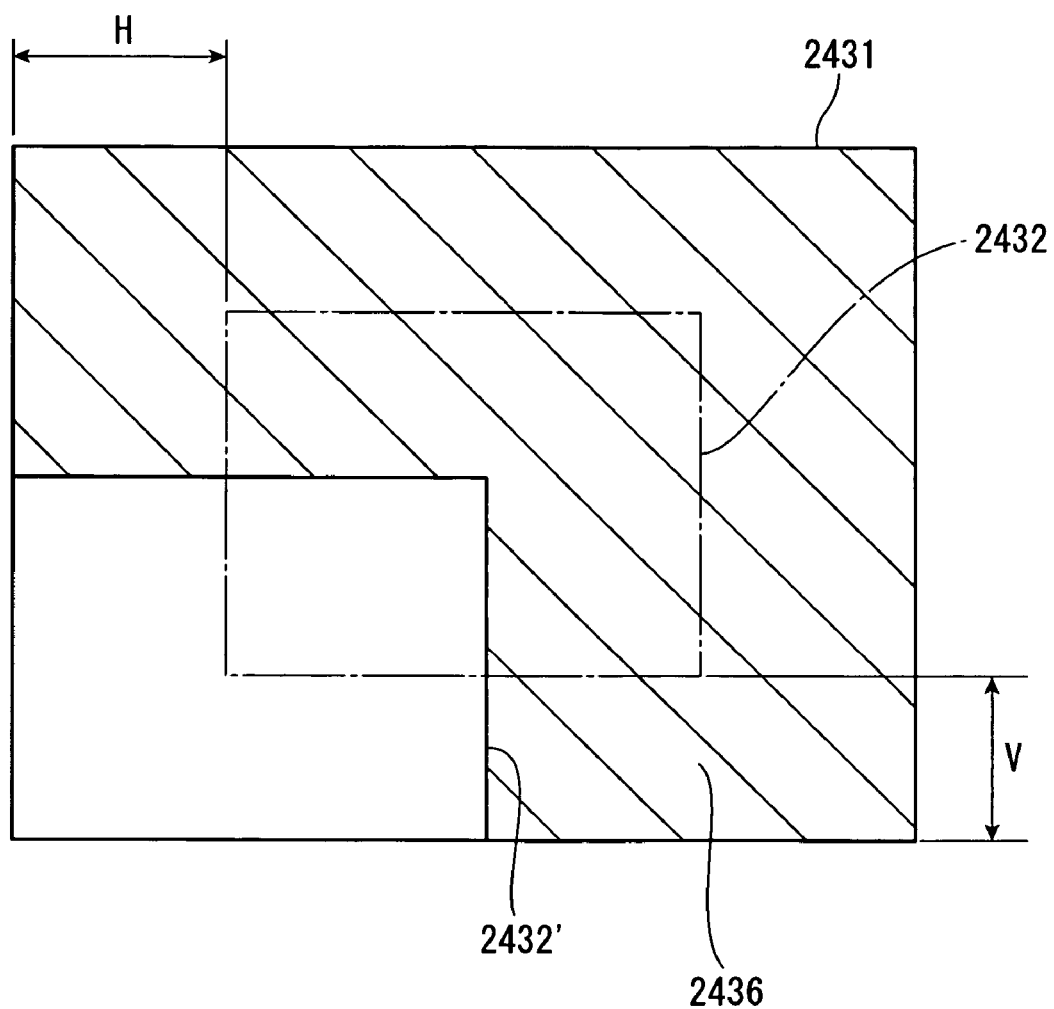
FIG. 8 is an illustration showing an example of position change processing of a formation area position changer according to the aforesaid exemplary embodiment.

FIG. 8 is an illustration showing an example of the position change processing of the formation area position changer 38.

The formation area position changer 38 moves the formation area 2432 corresponding to the image data supplied from the formation area size changer 33 by the horizontal position change amount (H) and the vertical position change amount (V) output from the controller 36 to be a formation area 2432'. In this step, within the valid area 2431, the area 2436 excluding the formation area 2432' is set in the blanking state.

Detailed description of this position change processing will be omitted, since it can be performed in a manner substantially same as the readout operation (position change processing) of the controller 36 described in the first exemplary embodiment.

The formation area position changer 38 supplies image data corresponding to the formation area 2432' to the keystone distortion corrector 34 after the above-described position change processing, and the keystone distortion corrector 34 performs the keystone distortion correction processing to write corrected image data at a pixel (address) corresponding to the formation area 2432' (which will be a corrected formation area after the keystone distortion correction processing) in the memory 35.

The controller 36 makes the keystone distortion corrector 34 execute operation for reading data from a predetermined address in the memory 35 in synchronization with the clock signals input through the receiver 31 to read corrected image data corresponding to the formation area 2432' (which will be the corrected formation area after the keystone distortion correction processing).

Then, as in the case of the first exemplary embodiment, the corrected image data and the black image data corresponding to the area excluding the corrected formation area are supplied to the optical modulator driver 37, so that the optical modulator 243 forms an optical image on which the image quality adjustment processing, the size change processing, position change processing and the keystone distortion correction processing are performed.

In the above-described second exemplary embodiment, if compared with the first exemplary embodiment, since the keystone distortion corrector 34 performs the keystone distortion correction processing after the size change processing of the formation area size changer 33 and the position change processing of the formation area position changer 38, the keystone distortion correction processing can be performed according to a change of the distortion caused when the projection image 100 is enlarged or reduced and when the position of the projection image 100 is changed.

While the present invention has been described above with the preferable exemplary embodiments, the present invention is not limited to the above-described exemplary embodiments, but includes improvements and modifications as long as an object of the present invention can be achieved.

In the respective exemplary embodiments, the projection lens 25 may be so configured that the relative position of a plurality of the lenses is adjustable to have a zoom adjustment function and a focus adjustment function. Further, the projection lens 25 may be configured to be movable in the vertical direction (in FIG. 1) and in the direction orthogonal to the paper for enabling the horizontally-tilting and vertically-tilting projections.

In the respective exemplary embodiments, a light beam shield for shielding the light beam may be provided on the upstream and/or the downstream of the optical modulator 243, and the control devices 3 and 30 may control the movement of the light beam shield to match the position of the area 2436. With such configuration, since the light beam transmitted from the area 2436 is mechanically shielded, the contrast ratio between the corrected formation area 2434' of the optical modulator 243 and the area 2436 is increased, and therefore the projection image 100 can be projected sharply on the screen Sc.

Although three optical modulators 243 are employed in the respective exemplary embodiments, they may be replaced by a single optical modulator, two optical modulators, or more than three optical modulators. Although a transmissive liquid crystal panel is used for the optical modulator 243, a reflective liquid panel may be used. Further, without limiting to the liquid crystal panel, a Digital Micromirror Device (trademark of Texas Instruments Incorporated) may be used for the optical modulator 243.

Although the projector 1 is described as a front projector for projecting from the side to view the screen Sc in the respective exemplary embodiments, the projector 1 may be a rear projector for projecting from the side opposite to the side to view the screen.

Although the best configurations for implementing the present invention have been disclosed above, the present invention is not limited thereto. In other words, while the present invention is mainly illustrated and described on the specific exemplary embodiments, a person skilled in the art can modify the specific configuration such as shape, material, quantity in the above-described exemplary embodiments as long as a technical idea and an object of the present invention can be achieved.

Therefore, the description limiting the shapes and the materials disclosed above is intended to be illustrative for easier under standing and not to limit the invention, hence the present invention includes the description using a name of component without a part of or all of the limitation on the shape and the material etc.

The priority applications No. JP2003-404371 and JP2004-271770 upon which this patent application is based are hereby incorporated by reference.

What is claimed is:

1. A projector comprising:

an optical modulator that forms an optical image by modulating a light beam irradiated by a light source;

a projection optical device that projects the optical image formed by the optical modulator in an enlarged manner; and a control device that makes the optical modulator form the optical image based on input image information, wherein the control device further comprises, a formation area size changer that inputs size information regarding the size of the optical image formed by the optical modulator and performs size change processing on the image information based on the size information to change the size of a formation area of the optical image within a valid area in which the optical image can be formed in the optical modulator;

a formation area position changer that inputs position information regarding the position of the optical image formed by the optical modulator and performs, based on the position information, position change processing on the image information with the size change processing performed thereon to change the position of the formation area within the valid area;

an optical modulator driver that makes the optical modulator form the optical image based on the image information on which the size change processing and the position change processing are performed; and a keystone distortion corrector that performs keystone distortion correction processing on the image information to correct a distortion of a projection image generated when the projector performs tilting projection, the keystone distortion corrector performing, based on the position information, the keystone distortion correction processing on the image information on which the size change processing is performed; and the formation area position changer performing the position change processing on the image information on which the size change processing and the keystone distortion correction processing are performed.

2. The projector according to claim 1, the formation area size changer and the formation area position changer setting a periphery of the formation area in a blanking state upon performing the size change processing and the position change processing on the image information;

the optical modulator driver making the optical modulator display the periphery of the formation area in black based on the image information on which the size change processing and the position change processing are performed.

3. A projector comprising:

an optical modulator that forms an optical image by modulating a light beam irradiated by a light source;

a projection optical device that projects the optical image formed by the optical modulator in an enlarged manner; and a control device that makes the optical modulator form the optical image based on input image information, wherein the control device further comprises, a formation area size changer that inputs size information regarding the size of the optical image formed by the optical modulator and performs size change processing on the image information based on the size information to change the size of a formation area of the optical image within a valid area in which the optical image can be formed in the optical modulator;

a formation area position changer that inputs position information regarding the position of the optical image formed by the optical modulator and performs, based on the position information, position change processing on the image information with the size change processing performed thereon to change the position of the formation area within the valid area;

an optical modulator driver that makes the optical modulator form the optical image based on the image information on which the size change processing and the position change processing are performed; and a keystone distortion corrector that performs keystone distortion correction processing on the image information to correct a distortion of a projection image generated when the projector performs tilting projection, the keystone distortion corrector performing the keystone distortion correction processing on the image information on which the size change processing and the position change processing are performed.

* * * * *